Nov. 28, 1950  W. N. STEVENSON  2,532,127
BATTERY POST GRIPPING HEAD FOR ELECTRIC CABLES
Filed Aug. 25, 1948

INVENTOR
William N. Stevenson
BY
ATTORNEY.

Patented Nov. 28, 1950

2,532,127

UNITED STATES PATENT OFFICE 2,532,127

BATTERY POST GRIPPING HEAD FOR ELECTRIC CABLES

William N. Stevenson, Fairland, Okla.

Application August 25, 1948, Serial No. 45,987

1 Claim. (Cl. 173—259)

This invention relates to battery cables particularly of the kind used with automobiles and the like, the primary object being to provide a specially formed connector head for the cable formed for quick and easy removal in rigid connection with one of the battery posts.

The most important object of this invention is to provide a battery post gripping head for electric cables having a pair of pivotally interconnected sections provided with complementary post gripping jaws adjacent one end thereof and a pair of spaced-apart projections extending from the pivotal point in an opposite direction from the jaws for receiving therebetween a wedge adapted to force the jaws together in tight engagement with the battery post.

Another important object of this invention is to provide a battery post gripping head for electric cables having a body provided with a cylindrical bore for receiving the battery post, the body being divided longitudinally through the bore to present a pair of sections, one of the sections having laterally extending ears embracing a part of the other section and providing a pivotal connection for such sections.

A further object of this invention is the provision of a battery connector of the aforesaid character wherein that portion of the sections extending in one direction from the point of connection for receiving the separable wedge is provided with opposed beveled faces for receiving a wedge to be driven therebetween and serving as a means for clamping the jaws of the head tightly about the battery post as the same pivot relatively intermediate the ends of the head.

Other minor objects will be made clear or become apparent as the following specification progresses, reference being had to the accompanying drawing, wherein.

It is common knowledge that one of the most harassing problems in the field of automobile mechanics is that of providing a connector for battery cables capable of tightly gripping the battery post and maintaining itself in such tight electrical connection while being readily removable as desired.

The common use of a clamp having a bolt and nut take-up means is unsatisfactory for the reason that after the same has been placed in use for a period of time, chemical corrosion not only makes the clamp difficult to remove but oftentimes, acts upon the material from which the clamp is made to such an extent that the cable becomes loose and the electrical connection broken.

The clamping means about to be described is always easy to remove and replace upon a battery post and is not likely to become loose because of the progressively tighter grip which the head imparts to the battery post once the same is applied thereto.

Figure 1:
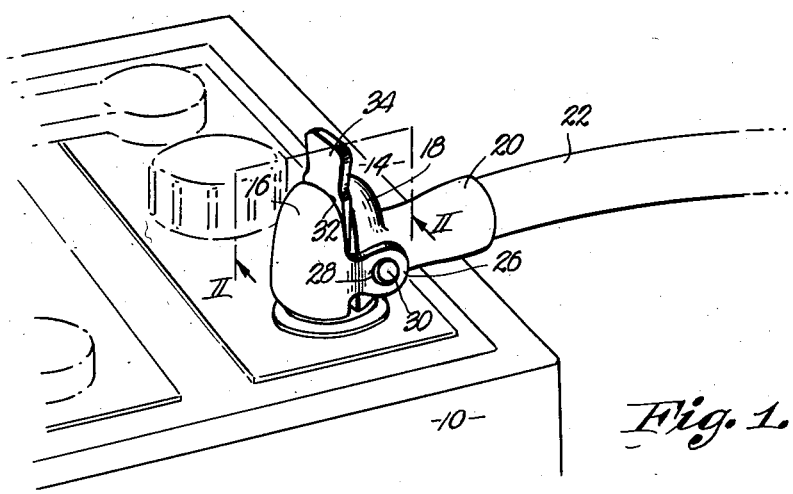
Fig. 1 is a perspective view of a battery post gripping head for electric cables made in accordance with the present invention showing the same operably connected with a battery post.

Fig. 1 of the drawing shows a conventional battery, broadly designated by the numeral 10, having a terminal post 12 as a part thereof. The gripping head forming the subject matter of this invention and broadly designated by the numeral 14, includes a pair of sections 16 and 18, the latter having a portion 20 extending therefrom for receiving an electric cable 22 in the usual manner.

It is contemplated that head 14 be formed from material capable of molding tightly about the cable 22 and connecting electrically the conductor of cable 22 with the battery post 12. The precise manner of interconnecting portion 20 of head 14 with the insulated cable 22 forms no part of this invention and the conventional method may well be used.

Figure 2:
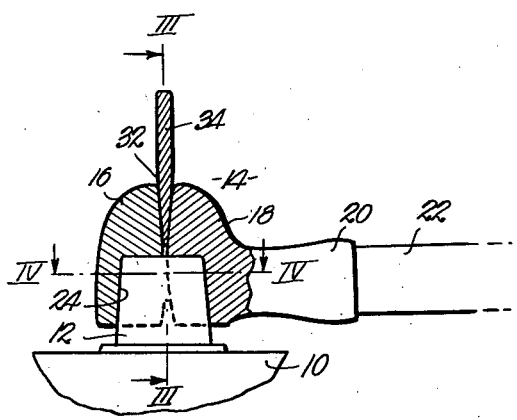
Fig. 2 is an elevational view partially in section taken on line II—II of Fig. 1, looking in the direction of the arrows.
Figure 3:
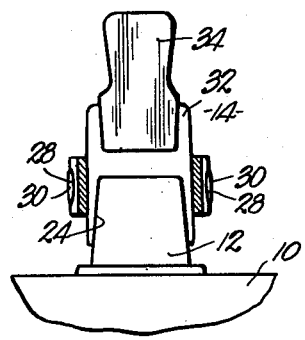
Fig. 3 is a vertical cross sectional view taken on line III—III of Fig. 2.
Figure 4:
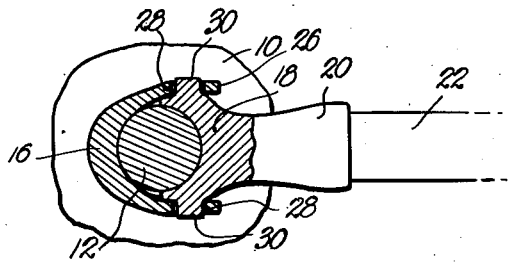
Fig. 4 is a transverse sectional view taken on line IV—IV of Fig. 2.

The head 14, including its sections 16 and 18, is substantially circular in cross section with one of its ends dome-shaped. The opposite end of the head 14 is provided with a cavity 24 for receiving the uppermost end of the battery post 12. Since this post 12 is substantially circular in cross section and somewhat truncated, the cavity 24 of the head 14 should conform to such contour of battery post 12. The bottom of the cavity 24 terminates intermediate the ends of the head 14 and as clearly illustrated in Fig. 2 of the drawing, the two sections 16 and 18 cooperate in forming cavity 24. In other words, a pair of substantially complementary jaws are presented by the two sections 16 and 18, said jaws being in diametrically opposed relationship. Thus the head 14 is divided on a line longitudinally through the cavity 24 and on a line substantially perpendicular to the longitudinal axis of the portion 20 for receiving cable 22.

The sections 16 of head 14 are provided with a pair of opposed, substantially parallel laterally extending ears 26 that overlap and embrace the section 18. Ears 26 are disposed intermediate the ends of the section 16 and immediately below the bottom wall of the cavity 24. Ears 26 are preferably cast integrally with the section 16 of head 14 and are provided with openings 28 for receiving pintles 30 projecting outwardly from the sides of the section 18 of head 14.

The openings 28 of the ears 26 are preferably elongated to the end that section 16 is freely swingable on section 18 for purposes hereinafter made clear.

The dome-shaped end of the head 14, i. e., that portion opposite to the cavity 24, has the sections 16 and 18 thereof provided with opposed beveled faces 32 for receiving a wedge 34. In other words, the faces 32 of sections 16 and 18 converge as the bottom wall of cavity 24 is approached and when the head 14 is placed in use by moving the same in capped relationship to the post 12, wedge 34 is moved into place between the faces 32 of sections 16 and 18. It is clear that as wedge 34 is driven inwardly toward the uppermost end of post 12, faces 32 will be spread apart and consequently the opposed arcuate jaws formed by cavity 24 will move together in tight gripping relationship with the post 12. Such inward movement of the jaws of head 34 against the post 12 is occasioned by the relative pivotal movement of the section 16 by reason of the ears 26 swinging freely on pintles 30. As wedge 34 is forced into place by tapping the uppermost end thereof, the jaws of the sections 16 and 18 will become progressively tighter against the post 12. Once the head 14 is thus securely fastened to the battery post 12, it will remain in such position over a long period of time without further attention. Any corrosion that might form on the post 12 or within the cavity 24 of head 14 will only serve to render the engagement more rigid and at all times the user is assured that a positive electrical connection is present between the battery post 12 and the conductor within cable 22. In spite of such corrosion, the connector is still easily removed by simply tapping the wedge 34 along one of its longitudinal edges whereby the same will readily move from between the inclined faces 32. The jaws formed by the cavity 24 will then easily separate from the post 12 by reason of the pivotal connection afforded by perforated ears 26 and pintles 30.

It is apparent from the foregoing that a gripping head for electric cables that can be easily and quickly mounted securely upon a battery post has been provided and that the same is inexpensive to manufacture, not easily damaged by use and capable of application without particular skill on the part of the user and without the necessity of specially formed tools as is presently the case when conventional connectors are used.

Such changes and modifications as fairly come within the scope of the appended claim are, therefore, contemplated hereby.

Having thus described the invention, what is claimed as new and desired to be secured by Letters Patent is:

A battery post gripping head for electric cables comprising a solid body having a cavity formed therein, said cavity being adapted to receive a portion of a battery post and being frusto-conical in conformity with the contour of said battery post, said body being divided through the cavity, presenting a pair of substantially complementary sections; a projection on one of the body sections for receiving an electrical cable; diametrically opposed, outwardly-extending pintles integral with one of said body sections and adjacent the innermost end of said cavity; a perforated ear on the other body section for pivotally receiving each pintle respectively; and a flat, tapered, wedge-like key insertable between said body sections in opposed relationship to said cavity for forcing the body sections into clamping relationship with the battery post when the latter is in the cavity, the outermost end of the battery post engaging said end of the cavity, and the walls of said body sections adjacent said key diverging outwardly in conformity with the contour of said key when the latter is inserted between the body sections.

WILLIAM N. STEVENSON.

REFERENCES CITED

The following references are of record in the file of this patent:

UNITED STATES PATENTS

| Number | Name | Date |
|---|---|---|
| 1,768,017 | Yogoda | June 24, 1930 |
| 1,795,415 | Walker | Mar. 10, 1931 |
| 1,996,355 | Smith | Apr. 2, 1935 |
| 2,370,227 | Bruder | Feb. 27, 1945 |